United States Patent
Dubois

(10) Patent No.: US 6,876,914 B2
(45) Date of Patent: Apr. 5, 2005

(54) ENGINE SPEED CONTROL SYSTEM

(76) Inventor: Garry Anno Dubois, 224-228 Chesterville Road, Moorabbin VIC 3189 (AU)

( * ) Notice: Subject to any disclaimer, the term of this patent is extended or adjusted under 35 U.S.C. 154(b) by 28 days.

(21) Appl. No.: 10/344,286
(22) PCT Filed: Aug. 7, 2001
(86) PCT No.: PCT/AU01/00964

§ 371 (c)(1),
(2), (4) Date: Feb. 6, 2003

(87) PCT Pub. No.: WO02/12012

PCT Pub. Date: Feb. 14, 2002

(65) Prior Publication Data

US 2003/0154015 A1 Aug. 14, 2003

(30) Foreign Application Priority Data

Aug. 7, 2000 (AU) .............................. PQ9230

(51) Int. Cl.$^7$ .............................. G05D 1/07; B60T 8/36; G06F 1/00
(52) U.S. Cl. .......................... 701/93; 701/97; 701/103; 701/104
(58) Field of Search .............................. 701/2, 93, 97, 701/103, 104, 107, 110

(56) References Cited

U.S. PATENT DOCUMENTS

| 6,016,458 | A | 1/2000 | Robinson et al. | 701/93 |
| 6,647,328 | B2 * | 11/2003 | Walker | 701/36 |
| 2001/0003808 | A1 | 6/2001 | Jeon | 701/93 |

FOREIGN PATENT DOCUMENTS

| DE | 29619863 U1 | 1/1997 |
| DE | 096 40 932 A1 | 4/1998 |
| DE | 196 54 659 A1 | 7/1998 |
| EP | 0 697 301 A1 | 2/1996 |
| FR | 2689067 A1 | 3/1992 |
| GB | 2 334 352 A | 8/1999 |
| GB | 2 334 700 A1 | 9/1999 |

OTHER PUBLICATIONS

Derwent Abstract Accession No. 97–054345/06, DE 29619863–U1 (Tischer II II) Jan. 2, 1997. Abstract and Figure. (Attached to Reference AM above).
Derwent Abstract Accession No. 93–379285/48, FR 2689067 A1 (Febwin, J.) Mar. 26, 1992. Abstract and Figure. (Attached to Reference AN above).
Derwent Abstract Accession No. 96–093483/10, JP 08–002285A (Nippon Denki Joho Service KK) Jan. 9, 1996.Abstract and Figure.
Derwent Abstract Accession No. 98–363705/32, DE 196 54 659 A1 (Rycak, M.) Jul. 2, 1998. Abstract and Figure. (Attached to Reference AP above).
Derwent Abstract Accession No. 98–231385/21, DE 196 40 932 A1 (Roth, W.) Apr. 16, 1998. Abstract and Figure. (Attached to Reference AQ above).

* cited by examiner

Primary Examiner—Thomas G. Black
Assistant Examiner—Brian J Broadhead
(74) Attorney, Agent, or Firm—Fish & Richardson P.C.

(57) ABSTRACT

An engine speed control system for a vehicle such as a go-kart in order to, independently of the driver, control the speed of the vehicle includes a butterfly valve which is moved by a stepper motor (70) upon receipt of over the air signals by a receiver (60) from a control station (50). The movement of the butterfly valve alters the amount of air and fuel drawn into the engine independent of control of a throttle assembly (22, 25) operated by the driver of the vehicle. Thus, the vehicle can be slowed from a control station (50) independently of the vehicle if necessary.

5 Claims, 2 Drawing Sheets

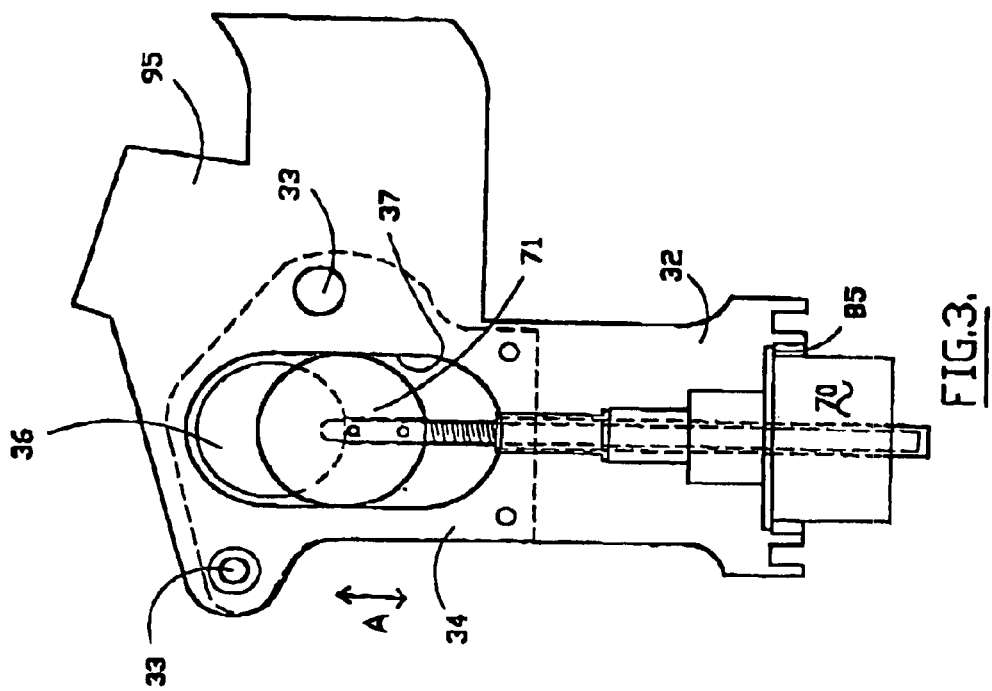
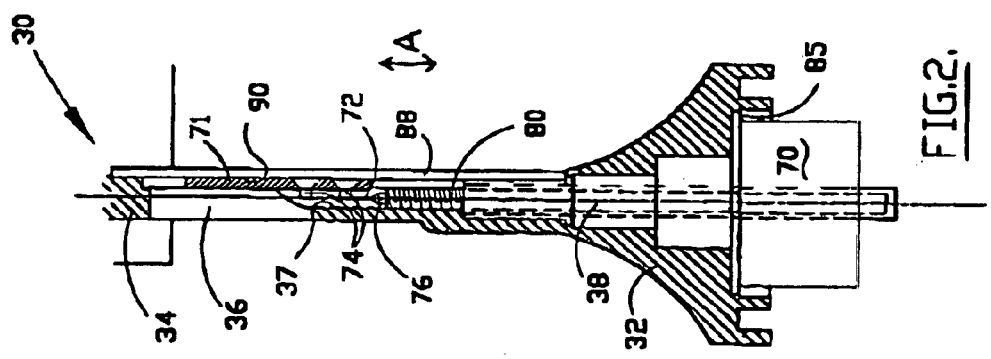

ENGINE SPEED CONTROL SYSTEM

This invention relates to an engine speed control system and to an engine having such a system. The invention has particular application to go-karts but could be used in other environments if desired.

Go-kart racing is a popular pass time. Go-kart tracks for novice riders are quite common and enable novice drivers to race go-karts for fun or to compete in races either on an individual basis or in groups. Generally, to participate in go-kart racing at this level no special licence is required. One problem which does occasionally occur with novice drivers is that such drivers may attempt to drive beyond their alibility or, may simply drive in an uncourteous or dangers manner.

Presently, there is a system which enables an operator to control the speed of go-karts on a track and this system involves the remote retarding of the electric system of the vehicle so as to cause some limited speed control over the vehicle. This system does therefore provide some limited control whereby an operator can reduce the speed of a go-kart should that be necessary but has the disadvantage that the changing of the electric timing of the vehicle causes incomplete combustion of fuel and therefore has a polluting effect.

The object of the present invention is to provide an engine control system which does not depend on a change of the ignition timing of the vehicle to slow the vehicle and therefore does not have the polluting effect of the prior art system.

The invention, in a first aspect, may be said to reside in an engine speed system for a vehicle having an engine, a fuel and air supply system for supplying air and fuel to the vehicle, and driver actuable means for controlling the supply of air and fuel so as to enable the speed of the vehicle to be increased or decreased by the driver of the vehicle, said system including;

a valve unit for selectively allowing, preventing or reducing the supply of air and fuel to the engine;

control means for moving the valve to alter the amount of fuel and air supplied to the vehicle to thereby change the speed of the vehicle independent of the driver actuable means; and receiver means for receiving a transmitted signal to cause the control means to move the valve unit for changing the speed of the engine independent of the driver.

Since the system includes a valve which alters the flow of air and fuel to the engine, the valve operates in the same manner as a carburettor or fuel supply system and thereby, independent of the driver, changes the speed of the vehicle in the same manner as a carburettor or other fuel and air supply system. Thus, the speed is changed without changing the ignition timing of the vehicle and therefore does not have the polluting effects of the prior art system.

Preferably the system includes a support member, the support member having an opening through which air and fuel can be supplied, said valve comprising a butterfly valve which is moveable in a linear manner so as to close the opening to a desired degree between a first position allowing maximum supply of air and fuel to the engine and a second position allowing minimum or no supply of air or fuel to the engine.

Preferably the control means comprises a stepper motor having a stepper motor shaft connected to the butterfly valve so that upon actuation of the stepper motor the shaft is moved to in turn move the butterfly valve between the fist and second positions.

Preferably the receiving means comprises a receiver and stepper motor controller for actuating the stepper motor to cause the butterfly valve to move between the first and second positions.

Preferably the system includes a transmitter for transmitting the transmitted signal to the receiver for detection by the receiver and for operating the stepper motor.

Preferably the transmitter is coupled to a computer for receiving operator inputs to cause the transmitter to transmit the transmitted signal.

In other embodiments of the invention the control means may include a servo-motor, or other electric motor, a cable control system for moving the valve or an air operated device for moving the valve.

In other embodiments the valve may be rotatable from an open position to a closed position rather than linearly moveable from an open position to a closed position. In other embodiments the butterfly valve may be moved be a lever arrangement acting through a fulcrum.

The invention may also be said to reside in an engine for a vehicle including;

a fuel and air supply system for supplying air and fuel to the engine;

a driver controlled throttle for controlling the fuel and air supply system for altering the speed of the engine;

a valve unit for selectively allowing, preventing or reducing the supply of air and fuel to the engine;

control means for moving the valve to alter the amount of fuel and air supplied to the vehicle to thereby change the speed of the vehicle independently of the driver; and receiver means for receiving a transmitted signal to cause the control means to move the valve for changing the speed of the engine independent of the driver.

Preferably the fuel and air supply means comprises a carburettor including a primary butterfly valve.

Preferably the valve unit includes a secondary butterfly valve.

The invention may also be said to reside in a method of controlling the speed of a vehicle on a driveway which is being driven by a driver, the method including the steps of;

transmitting a signal to the vehicle from a remote location by way of wireless transmission; and causing, by way of the transmission, the closing of a valve member independent of driver control, so as to reduce, increase or shut off supply of air and fuel to a vehicle of the engine, and whereby, the speed of the engine is thereby altered by the transmitted signal.

A preferred embodiment of the invention will be described, by way of example with reference to the accompanying drawings in which;

FIG. 2 is a cross-sectional view through the main component of the preferred embodiment; and FIG. 3 is a plan view of the components shown in FIG. 2.

Figure 1:
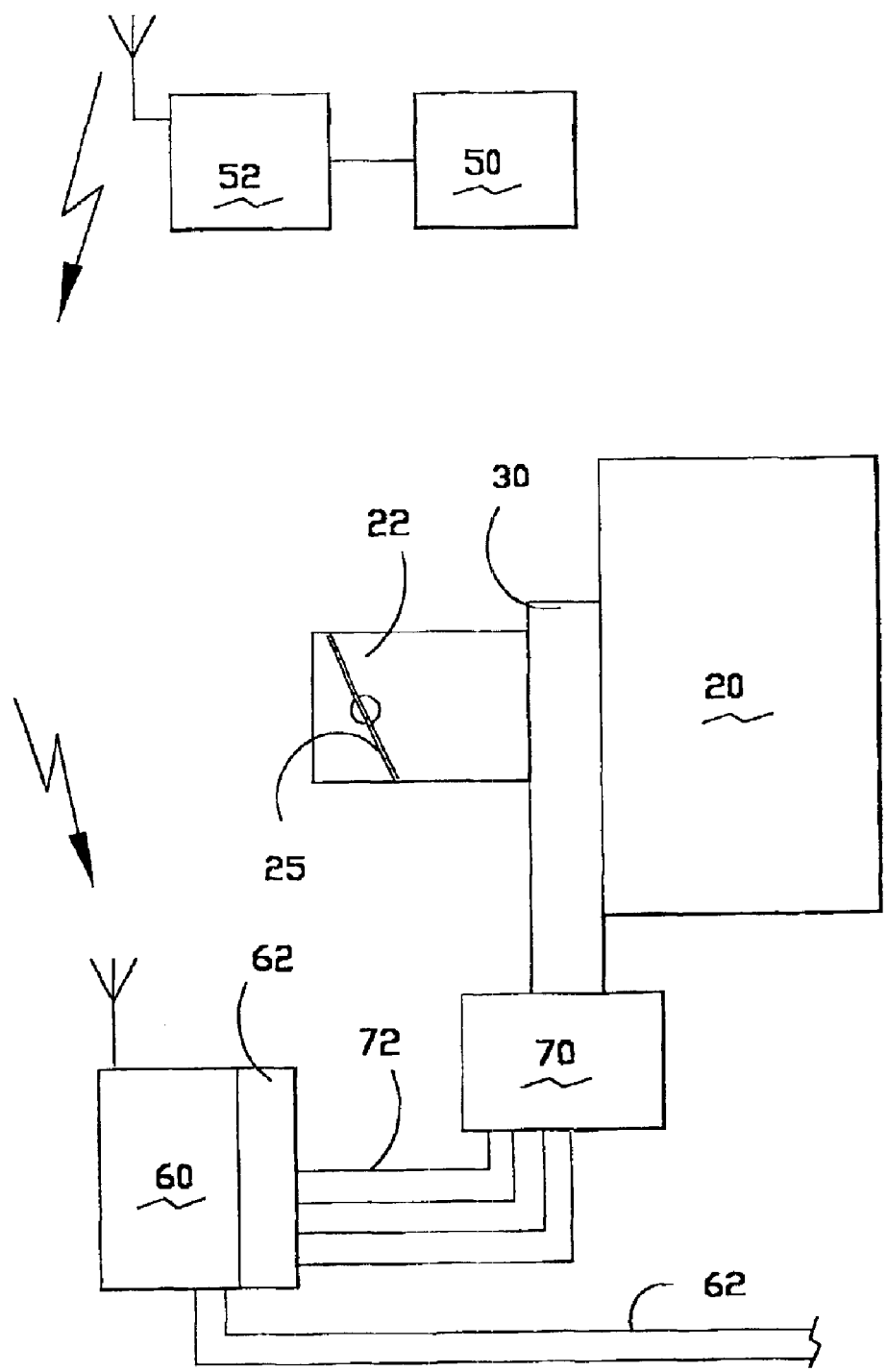
FIG. 1 is a schematic view of one embodiment of the invention.

With reference to FIG. 1 the engine control system of the invention is primarily intended for use with small capacity engines schematically represented by block 20 which may be one or two cylinder engines typically used in go-karts or like vehicles. Fuel and air is supplied to the engine 20 by a carburettor 22 in a conventional manner. However, rather than use a carburettor 22 fuel and air may be supplied by an injection system or the like. In conventional engines used in go-kart racing the carburettor 22 is separated from the engine by a spacer. The spacer, spaces the carburettor 22 from the engine 20, and also provides some insulation to prevent heat transfer into the carburettor 22 which may otherwise cause premature evaporation of fuel within the carburettor 22 thereby impairing operation of the carburettor.

The preferred embodiment of the present invention includes a support member 30 which can take the place of the spacer and which, if desired, can have the same shape as the spacer. Thus, the support member has the same function as the spacer to space the carburettor 22 from the engine 20 and also insulate the carburettor to some extent to prevent evaporation of fuel.

The support member 30 will be described in more detail with reference to FIGS. 2 and 3.

In normal operation of a vehicle such as a go-kart the driver will depress an accelerator pedal (not shown) to control primary butterfly valve 25 of the carburettor 22 to control the supply of air and fuel to the engine 20 to thereby control the speed of the engine 20.

The system of the preferred embodiment of the invention enables the speed of the engine 20 to be altered independent of the driver so that if desired, the speed of the vehicle can be reduced if the driver is driving at the speed beyond his or her capacity or driving in a dangerous or reckless manner. Alternatively, the speed can be increased if desired as will be explained in more detail hereinafter.

In order to alter the speed of vehicle independent of the driver, an operator is supplied with a computer 50 which couples to wireless transmitter 52. The computer 50 can store information relating to each of the vehicles and also can receive input data relating to the driver of the vehicles such as weight, and other perimeters indicative of the drivers ability. Each vehicle fitted with a system according to the present invention is controlled by a transmitted signal from the transmitter 52 of a different frequency which is received by a receiver 60 within the vehicle. The receiver 60 is powered by power wires 62 from a battery (not shown) or from a generator or alternator within the vehicle. The receiver 60 includes a stepper motor controller 62 or is coupled to a stepper motor controller 62 which is connected to a stepper motor 70 by lines 72. The stepper motor 70 is preferably mounted on the support member 30 as will be described in more detail with reference to FIG. 3.

The operator can initially set the maximum speed of the vehicle by causing the transmitter 52 to output a signal to the receiver 60 to cause the receiver 60, via the stepper motor controller 62, to control the stepper motor 70 to adjust the system to limit the maximum speed of the vehicle to a predetermined level. If during the course of driving the driver is driving recklessly or obviously driving at a speed which is beyond his ability, the speed can be reduced by the operator in putting an appropriate input into the computer 50 indicative of the vehicle concerned so that an output signal is transmitted from the transmitter 52 and received by the receiver 60 of the vehicle concerned so that the stepper motor 70 can be adjusted to reduce the maximum speed of the vehicle or to stop the vehicle completely.

The support member 30 is shown in FIGS. 2 and 3 and comprises a frusto-conical shaped end portion 32 which has a substantially flat plate portion 34 extending outwardly therefrom. The plate 34 has an opening 36 which may be circular in cross section which aligns with the carburetor 22 and the inlet to the engine 20 when the support member 30 is mounted on the engine 20. The support member 30 may be mounted in place by bolts 33 shown in FIG. 3. The plate 34 is provided with a recess or grooved section 37 and the section 37 communicates with a bore 38 provided in the frusto-conical portion 32. A butterfly valve 71 is provided within the recess 37 and is bolted to a butterfly shaft 72 by screws or bolts 74. The shaft 74 has a bore 76 which has an internal screw thread for connection to a screw threaded stepper motor shaft 80 of the stepper motor 70. The stepper motor 70 is attached to end wall 85 of the frusto-conical portion 32.

Thus, when the stepper motor 70 is actuated the stepper motor shaft 80 moves in a linear fashion in the direction of double headed arrow A in FIGS. 2 and 3 as to move the butterfly valve 71 in the same direction so that the butterfly valve can completely open the opening 36 or alternatively completely close the opening 36 or close the opening 36 to a partial extent.

The support member 30 is closed by an insulating plate 88 which provides insulation to the support member 30 and also to the carburettor 22. The plate 88 also provides an interior surface 90 on which the butterfly valve 71 can slide from its first position in which the opening 36 is completely open to its second position where the opening 36 is completely closed.

Thus, as previously mentioned, in order to limit the speed of the vehicle or completely stop the vehicle, the stepper motor 70 is controlled via the transmitter 52, the receiver 60 and the stepper motor controller 62 so as to cause the stepper motor shaft 80 to move in the direction of double headed arrow A to adjust the position of the butterfly valve 71 relative to the opening 36. If it is desired to slow the vehicle, the opening 36 is closed to a greater extent via the butterfly valve 71, or if it is desired to completely stop the vehicle the butterfly valve 71 is moved so that it completely closes the opening 36 to shut off the supply of air and fuel to the vehicle completely.

The butterfly valve 71 may be formed from metal, such as aluminum, or from plastics material. The frusto-conical section 32 and plate section 34 of the support member 30 are preferably formed from metal such as aluminum.

As shown in FIG. 3 the plate member 34 may include a flange or ancillary plate section 95 which provides for additional cowling over the motor 20 to guide air flow over the motor or to support cabling such as spark plug leads or other engine components.

As has previously been made clear, the system according to the present invention therefore enables an operator, from a remote position, to control the speed of a vehicle in the event of dangerous driving or if it is apparent that a driver is driving beyond his or her capacity. Furthermore, the initial speed limit of the vehicle can be set for handicapping purposes for novice racing so as to limit the speed of some vehicles relative to others dependant on the weight of the driver, the ability of the driver or other perimeters.

The computer 50 may have stored in it appropriate date relating to a frequency of the transmitted signal applicable to each of the vehicles and data relating to each of the vehicles so that the vehicles can be identified and appropriate inputs made into the computer 50 to cause appropriate signals to be transmitted by the transmitter 52 to control the speed of the required vehicles. The input may be by way of keyboard or touch screen or the like.

Whilst the preferred embodiment has been described with reference to controlling the butterfly valve for linear movement by a stepper motor, the valve could be a rotary valve or other moveable valve controlled by some other mechanism such as other types of motors or, an air operated device such as an air ram or cylinder, or a cable system which causes winding in of a cable or the reeling out of a cable to cause the valve 71 to move to close or partially close the opening 36.

Normal fuel compatible gasket material may also be disposed between the support member 30 and the engine 20 and the carburettor 22 if desired. The stepper motor shaft 80 may be sealed within the bore 38 by a tube or pilot guide (not shown) or by a suitable seal so as to prevent the ingress of air through the bore 76.

In still further embodiments, rather than provide a stepper motor which has a stepper shaft arranged for linear movement, the stepper motor may have a rotary shaft and the rotary shaft may be coupled to the butterfly valve by a nut member so that upon rotation of the shaft the nut member is driven back and forward in a linear direction to cause the butterfly valve to move in a linear direction.

Since modifications within the spirit and scope of the invention may readily be effected by persons skilled within the art, it is to be understood that this invention is not limited to the particular embodiment described by way of example hereinabove.

What is claimed is:

1. A vehicle including;
    a fuel and air supply system for supplying air and fuel to the engine;
    a driver controlled throttle for controlling the fuel and air supply system for altering the speed of the engine;
    a valve unit-separate to the driver controlled throttle and not operable by a driver of the vehicle for selectively allowing, preventing or reducing the supply of air and fuel to the engine;
    control means for moving the valve to alter the amount of fuel and air supplied to the vehicle to thereby change the speed of the vehicle independently of the driver; and
    receiver means for receiving a transmitted signal to cause the control means to move the valve for changing the speed of the engine independent of the driver.

2. The vehicle of claim 1 wherein the fuel and air supply means comprises a carburettor including a primary butterfly valve.

3. The vehicle of claim 1 wherein the valve unit includes a secondary butterfly valve.

4. The vehicle of claim 1 wherein the valve unit is a linearly moveable valve.

5. A method of controlling the speed of a vehicle on a driveway which is being driven by a driver, the method including the steps of;
    providing a vehicle with a driver throttle control means operable by the driver to set the speed of the vehicle;
    providing a valve member in the vehicle independent of the driver throttle control means and which is not operable by the driver, the valve member being actuable to adjust the speed of the vehicle;
    transmitting a signal to the vehicle from a remote location by way of wireless transmission; and
    causing, by way of the transmission, the closing of the valve member independent of driver control, so as to reduce, increase or shut off supply of air and fuel to a vehicle of the engine, and whereby, the speed of the engine is thereby altered by the transmitted signal.

* * * * *